D. R. MEEK.
BAKING OVEN.
APPLICATION FILED JUNE 18, 1921.

1,408,220. Patented Feb. 28, 1922.
2 SHEETS—SHEET 1.

Inventor
D. R. MEEK.
By his Attorneys

D. R. MEEK.
BAKING OVEN.
APPLICATION FILED JUNE 18, 1921.

1,408,220.

Patented Feb. 28, 1922.
2 SHEETS—SHEET 2.

Inventor
D. R. MEEK.
By his Attorneys

UNITED STATES PATENT OFFICE.

DAVID R. MEEK, OF WESTPORT, CONNECTICUT, ASSIGNOR TO MEEK OVEN MANUFACTURING COMPANY, INC., OF WESTPORT, CONNECTICUT, A CORPORATION OF NEW YORK.

BAKING OVEN.

1,408,220.      Specification of Letters Patent.      Patented Feb. 28, 1922.

Application filed June 18, 1921. Serial No. 478,467.

*To all whom it may concern:*

Be it known that I, DAVID R. MEEK, a citizen of the United States, residing at Westport, county of Fairfield, State of Connecticut, have invented a certain new and useful Improvement in Baking Ovens, of which the following is a full, clear, and exact description.

My invention relates to baking ovens and has for its object to produce an oven having a vertical series of stationary shelves about which a baking temperature is kept substantially uniform in all parts. It further has for its object to provide an oven having in one enclosure stationary shelves suitable for cooking cakes and pastries and other delicate objects and a rotating reel for cooking bread and the like, all surrounded by a substantially uniform temperature. It further has for its object to produce a reel-containing oven the baking capacity of which is increased without increasing correspondingly the dimensions thereof. It further has for its object to provide an oven having a set of rotating shelves and a set of stationary shelves placed side by side without either set interfering with the accessibility of the other.

The following is a description of an embodiment of my invention, reference being had to the accompanying drawings, in which.

Figure 1:
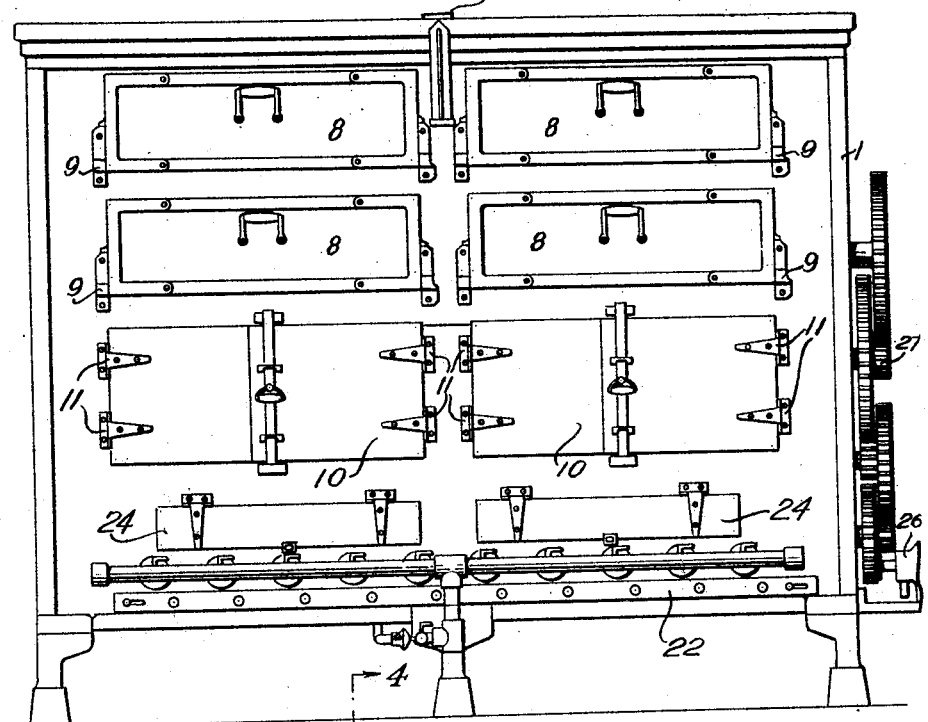
Figure 1 shows an elevation of the front side of the oven.
Figure 2:
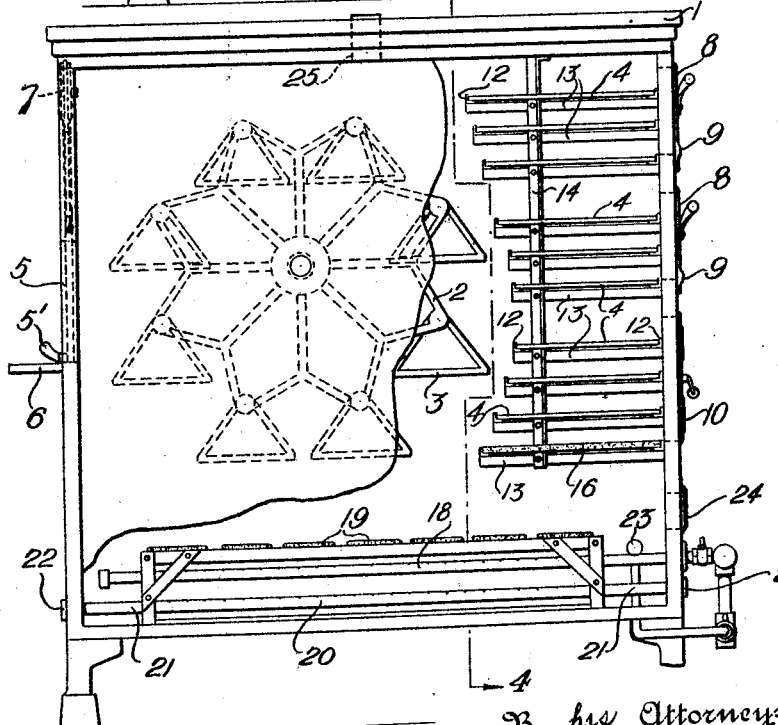
Fig. 2 shows an end elevation of the same, with parts of the oven wall broken away.

Referring more particularly to the drawings, 1 is the oven enclosure. Within this oven enclosure is a suitably mounted rotatable reel 2 carrying pivotally mounted swinging shelves 3 which shelves hang down so as to have their supporting surfaces always in horizontal position. At one side of the reel 2 and within the enclosure is arranged a plurality of wire grids 4 constituting stationary shelves supported by the walls of the enclosure and occupying space between two horizontal planes approximately in line with the upper and lower portions of the reel 2.

The intermediate shelves are shallow enough so as not to interfere with the movements of the reel and its shelves. The shelves in the upper and lower parts of the series are considerably longer than the intermediate shelves extending into space above and below the stationary shelves, and thus increasing the baking capacity of the oven without correspondingly increasing its dimensions. Similar increase in capacity is also secured by placing the stationary shelves nearer together than the shelves on the reel, that being permissible because the shelves are stationary and because of the character of the things to be baked thereon.

The reel is adjacent to the rear wall of the enclosure and that wall is provided in its central portion with an elongated vertically sliding door 5 having a handle 5', and has beneath the door an outwardly extending shelf 6. The door 5 is supported at its upper end in the usual manner by counterweights carried by cables passing over pulley 7 so as to be adapted to move upward to open position so as to afford access to the shelves of the reel adjacent thereto for the purposes of introducing and removing articles from the shelves.

Opposite some of the shelves 4 are doors 8—8 hinged at 9—9 so as to swing outward around horizontal axes to open position, and opposite the lowermost of the shelves 4 are doors 10 hinged at 11 so as to swing to open and closed position around vertical axes. Through these outwardly swinging doors 8 and 10 access is had to the stationary shelves so that things may be placed thereon and removed therefrom as desired. By having a plurality of doors at the several points as shown access can be had to all portions of the stationary shelves at one point after another so as not to cool off the oven as much as though access could be had through one large door only. By placing the door for the reel shelves on the opposite side from the doors for the stationary shelves, the whole of the front wall may be covered with stationary shelves, and furthermore, the reel shelves when loading or unloading are close to the rear wall and to the elongated door therein.

Figure 5:
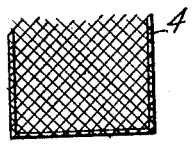
Fig. 5 shows a detail of one of the stationary shelves.
Figure 3:
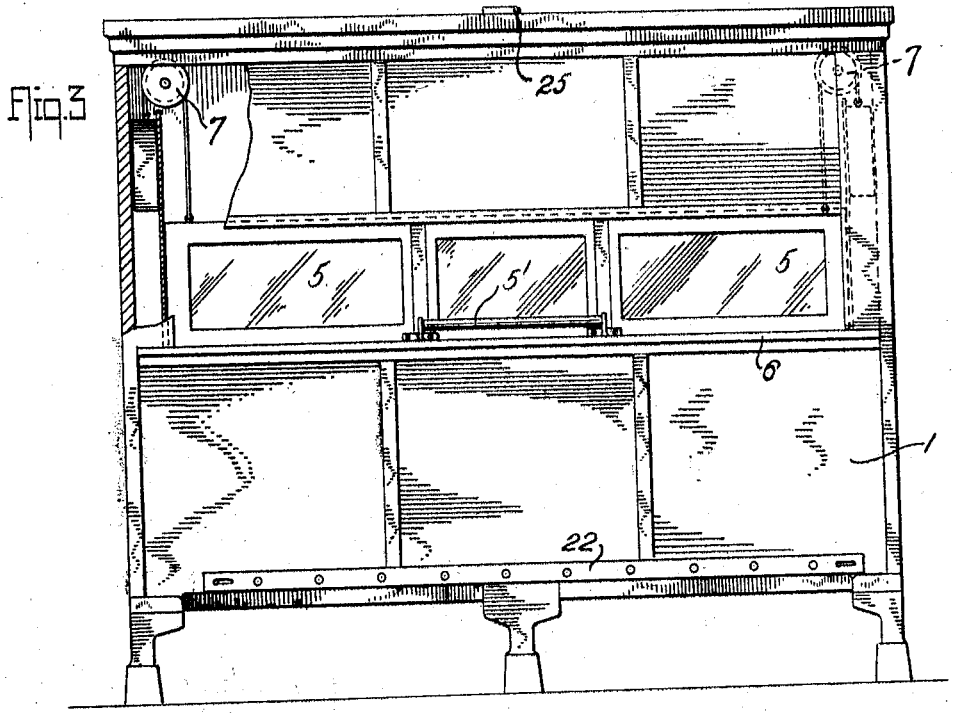
Fig. 3 shows an elevation of the rear side of the oven.
Figure 4:
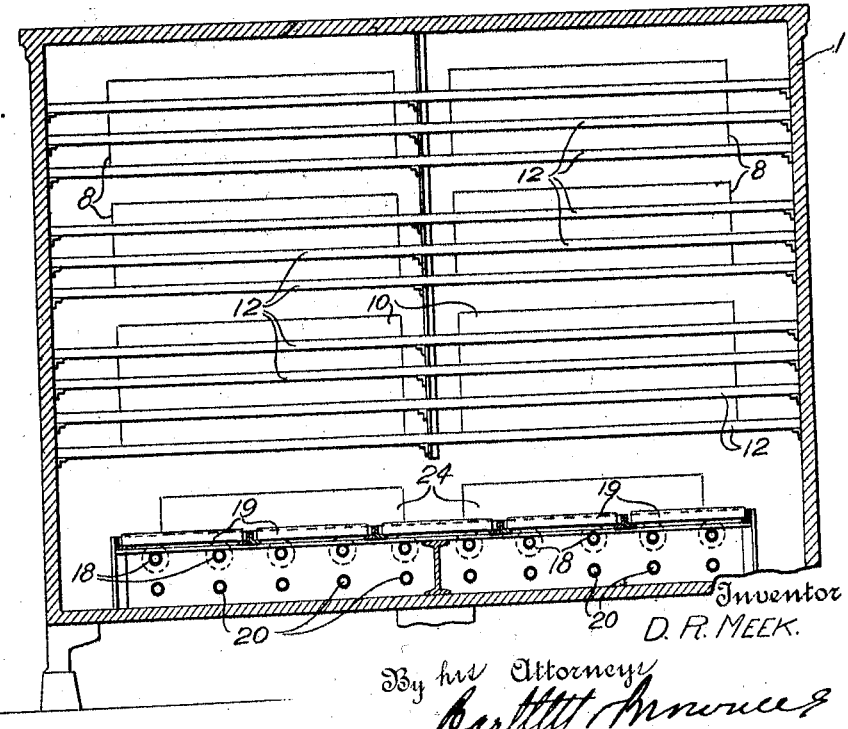
Fig. 4 shows a section on the line 4—4, Fig. 2.

The stationary shelves are of openwork construction, being formed of wire as shown in Fig. 5 so as to permit free circulation of air about the articles thereon. They are supported by angle irons 12 which are secured to the inner walls of the oven enclosure. The central portions of these angle irons are supported by angle irons 13 whose inner ends are supported by a rod 14 secured to the top of the enclosure and depending therefrom. Below the lower shelf 4 I provide a supporting structure in which earthenware tiles 16 are substituted for the wire grids, the purpose being to provide at this point means to absorb heat from the atmosphere of the oven which means will retain the heat and act to quickly restore the temperature to normal condition if it is somewhat reduced by the opening of the doors giving access to the stationary shelves. These earthenware tiles also protect the lowermost stationary shelves from too direct action of the heat rising from the burners.

In order to further maintain the proper temperature within the oven enclosure I introduce over the Bunsen burner tubes 18 a platform of suitably supported earthenware tiles 19. Below the burners I introduce a series of air pipes 20 having longitudinally spaced perforations for discharging air adjacent to the burner tubes, these pipes 20 opening to the air at both their front and rear ends 21, which openings are suitably controlled by sliding dampers 22. 23 is an ordinary pilot burner tube to which access is had through doors 24. A suitable opening 25 is provided for the discharge of the gases of combustion from the upper part of the enclosure sufficient to enable the burners to be kept ignited in the lower part of the oven. The column of heated air passing out from this discharge opening acts to draw in air through the air pipes 20 to supply the oxygen necessary for the proper combustion of the mixture supplied through the Bunsen tubes. The Bunsen tubes are of ordinary construction, being each provided with an injector nozzle which causes the injected gas to draw in air and become mixed therewith before ignition. 26 is an electric motor mounted at one end of the enclosure and driving the rotatable reel 2 through a suitable train of reducing gearing 27.

In the operation of this oven the burners are lighted so as to heat the oven up. When sufficiently hot the articles to be baked are placed upon the revolving reel and also upon the stationary shelves through the corresponding doors. The reel is then kept in operation, with the result that not only does it vary the position of the articles carried thereby, but it produces a circulation of the air within the oven and about the articles on the openwork shelves such that the heat within the oven is distributed so as to act with substantial uniformity upon all articles placed upon the stationary shelves, thus doing away with the objection in the ordinary stationary oven of having the upper shelves much more highly heated than the lower shelves.

The space occupied by the stationary shelves is to a large extent space which would otherwise be idle, so that by the use of the stationary shelves in that space and their closer spacing the capacity of a reel oven is largely increased without correspondingly increasing its vertical or horizontal dimensions. The use of the stationary shelves in conjunction with the reel affords a means of baking delicate things which should not be subjected to any movement or vibration at the same time as more bulky and less delicate things for which a reel is suitable.

The tiles within the oven adjacent to the shelves and to the burners also serve to distribute and maintain an even heat, and the introduction of the air through the air tubes results in a constant flow of air as distinguished from gusts of air which are liable to enter when the bottom of the oven is perforated. Furthermore, by reason of the dampers 22 the air can be taken from the side of the oven away from any drafts and the supply of air can be easily controlled. All these features tend toward uniformity of temperature and increase the efficiency of the oven.

As will be evident to those skilled in the art, my invention permits of various modifications without departing from the spirit thereof or the scope of the appended claims.

What I claim is:

1. In a baking oven, the combination of an enclosure, a rotatable reel therein carrying hanging shelves, power actuated means for rotating said reel, a series of stationary shelves within said enclosure and extending vertically between said reel and a vertical side wall of said enclosure, doors for providing access to said reel and shelves, and means for heating said enclosure, the motion of said reel causing a circulation of the heated air within said enclosure and about said stationary shelves.

2. In a baking oven, the combination of an enclosure, a rotatable reel therein carrying hanging shelves, power actuated means for rotating said reel, a series of stationary shelves within said enclosure and extending vertically between said reel and a vertical side wall of said reel and shelves, and means for heating said enclosure, the motion of said reel causing a circulation of the heated air within said enclosure and about said stationary shelves, the shelves remote from the horizontal plane passing through the axis of said reel being deeper than the shelves adjacent to said horizontal plane and extending longitudinally over the shelves of said reel.

3. In a baking oven, the combination of an enclosure, a rotatable reel therein carrying hanging shelves, power actuated means for rotating said reel, a series of stationary shelves within said enclosure and extending vertically between said reel and a vertical side wall of said enclosure, doors for providing access to said reel and shelves, and means for heating said enclosure, the motion of said reel causing a circulation of the heated air within said enclosure and about said stationary shelves, the doors for providing access to said reel and shelves respectively being on opposite sides of said enclosure.

4. In a baking oven, the combination of an enclosure, a rotatable reel therein carrying hanging shelves, power actuated means for rotating said reel, a series of stationary shelves within said enclosure and extending vertically between said reel and a vertical side wall of said enclosure, doors for providing access to said reel and shelves, means for heating said enclosure, the motion of said reel causing a circulation of the heated air within said enclosure and about said stationary shelves, and earthenware tiles located adjacent to the bottom of said series of fixed shelves.

DAVID R. MEEK.